UNITED STATES PATENT OFFICE.

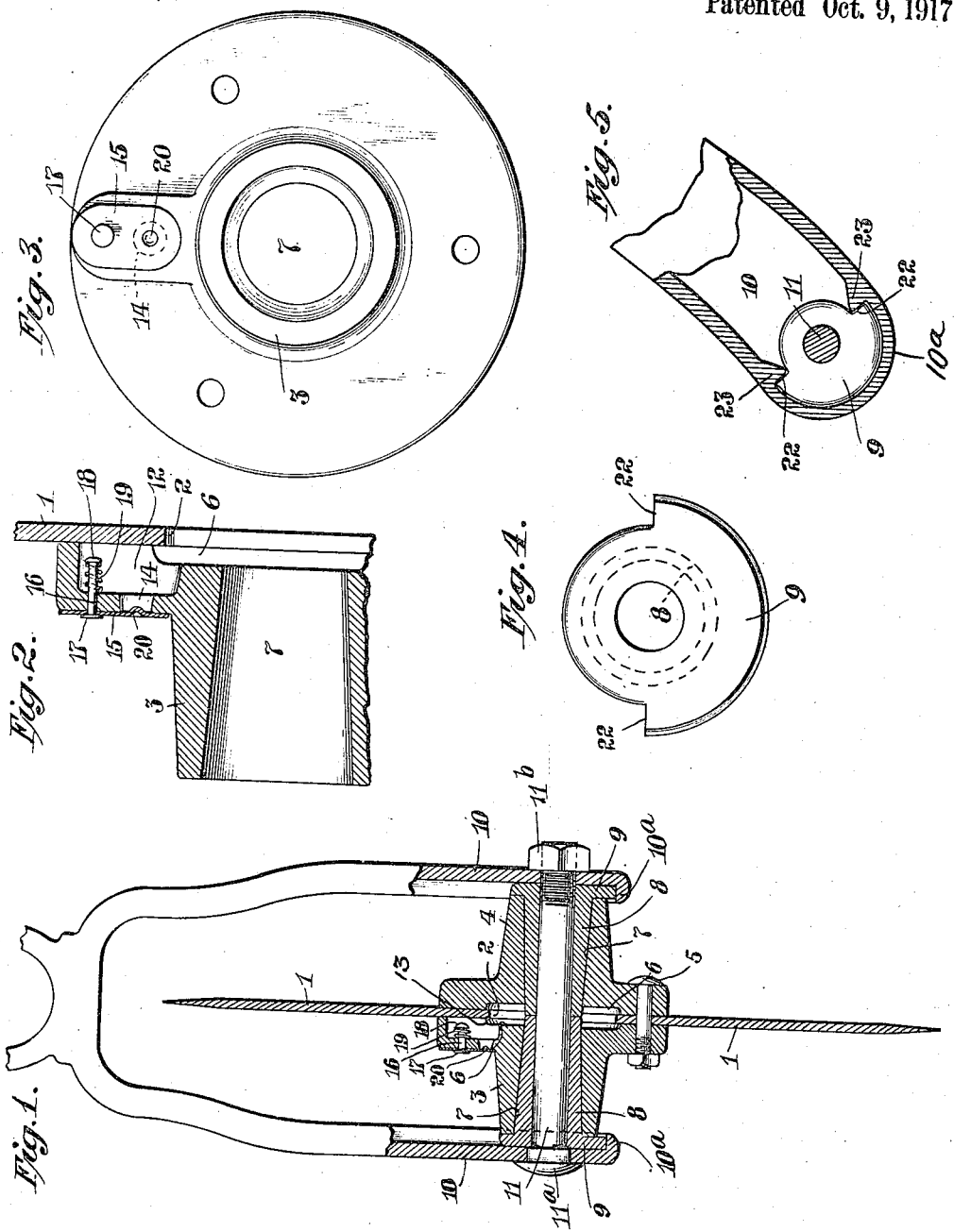

HARRY S. DICKINSON, OF MOLINE, ILLINOIS, ASSIGNOR TO MOLINE PLOW COMPANY, A CORPORATION OF ILLINOIS.

ROLLING COLTER.

1,242,154.        Specification of Letters Patent.        Patented Oct. 9, 1917.

Application filed May 11, 1916.   Serial No. 96,768.

*To all whom it may concern:*

Be it known that I, HARRY S. DICKINSON, a citizen of the United States, residing at Moline, in the county of Rock Island and State of Illinois, have invented certain new and useful Improvements in Rolling Colters, of which the following is a specification, reference being had therein to the accompanying drawing.

This invention relates to rolling colters for use on agricultural machines, the object of the invention being to produce a colter which will be effective and durable in operation and which may be conveniently manufactured at a minimum of expense.

It is important for the proper and effective operation of rolling colters that the over-all width of the same will be of the minimum extent, so that it may pass over any trash that may be upon the ground without gathering the same and causing it to be wound about the colter hub or the yoke which supports the colter. It is also important that the bearings for the colter be of such dimensions as to withstand severe and constant service; be easily lubricated, and exclude as far as possible, dust and dirt. Also the bearings should be of such form that the blade of the colter will run true and will continue so throughout its life.

My invention is designed to produce a colter which will answer these several requirements, and it consists in various features of improved construction and arrangement as will be fully pointed out in the specification to follow, and the novel parts of which will be specified in the appended claims.

In the accompanying drawings:

Figure 1 is a vertical axial sectional elevation of my improved colter, a portion only of the supporting arms being shown.

Fig. 2 is a fragmentary sectional view of one of the hub members on an enlarged scale, showing the oil feeding chamber therein.

Fig. 3 is a side elevation on an enlarged scale of the complete member of the colter hub shown in the preceding figure.

Fig. 4 is an end view of one of the journal members for the hub.

Fig. 5 is a sectional inside plan view of the lower end of one of the yoke arms showing the relative position of the journal member to said arm.

Referring to the drawings:

1 indicates a colter blade of the usual disk form provided with a central circular opening 2. 3 and 4 indicate two hub members which are applied to opposite sides of the colter blade around the central opening and which are firmly connected to the blade, as by the rivets 5. The adjacent faces of the hub members are extended inwardly beyond the edge of the opening in the blade and are recessed so as to conjointly form an annular oil holding chamber or reservoir 6 inward of the edge of the opening. Communicating with this chamber and extending axially through the hub members, is a bearing opening 7 which opening slopes outwardly in opposite directions from the oil chamber and constitutes in effect two conical bearing openings within the hub disposed in alinement with each other. Extending through this bearing opening is a journal in the form of two conical journal members 8 provided on their outer ends with annular heads 9 disposed at the outer ends respectively of the hub, the inner ends of the said journal members abutting against each other and being exposed within the annular oil chamber, whereby the journal members give rotary support to the hub. 10, 10, indicate two parallel supporting arms which are connected together at their upper ends to form in effect a supporting yoke. These arms extend at the outer sides of the heads on the journal members, and are connected thereto by means of a through bolt 11 which extends through the ends of the arms and the two journal members, one end of the bolt being provided with a head 11$^a$ and the other end with a nut 11$^b$ screwed thereon. By this means the two journal members are connected together and to the arms so as to form in effect a journal bearing for the hub, the through bolt enabling the parts to be drawn up together in operative relations so as to constitute a firm journal support giving rotary support to the hub.

The arms are provided with inwardly extending edge flanges 10$^a$ constituting shields which extend beyond and cover the joint between the heads on the journal members and the ends of the hub, and thereby prevent any dirt that may gather or fall from the colter blade from finding its way into these joints.

At one side and at a point beyond the annular oil chamber 6, one of the hub members is recessed interiorly as at 12 so as to form an oil feeding chamber which at its inner end communicates by a restricted feed opening 13 with the annular chamber 6, so that the oil fed into the chamber 12 will flow into the annular chamber. The chamber 12 is provided with a supply opening 14 closed by a cover 15 in the form of a plate having a hole therethrough to receive a pivot pin 16 which extends through the hole and through a hole in the wall of the chamber. The end of the pin within the chamber is provided with a head 17, and its opposite end is provided with a head 18, a spiral spring 19 encircling the pin within the chamber, with one end bearing against the head 16 and the opposite end bearing against the inner face of the wall of the chamber. This spring tends to hold the cover plate flatly but yieldingly against the outer face of the chamber wall. The cover plate is formed with an inwardly extending teat or projection 20 which seats in the supply opening 14 and thereby maintains the cover plate yieldably over the opening. From the construction described it will be understood that the cover plate, when oil is to be introduced through the supply opening, may be swung to the side on the axis of the bolt 16 as a center to expose the opening, the spring permitting the plate to yield sufficiently to allow the projection to disengage the opening.

The hub member by being recessed on its interior to form the oil feed chamber, does not require any increase in its axial extent at this point, so that the over-all width of the hub is reduced to the smallest possible dimensions. As a result the colter may pass through trash without liability of gathering the same.

The annular oil chamber 6 enables a sufficient supply of oil to be maintained, to lubricate the bearing surfaces without the necessity of frequent oiling; and due to the exposure of the inner ends of the journal members within the chamber, the oil will be supplied continuously and uniformly to the bearing surfaces. The inclination of the journal members and the surrounding bearing openings in the hub members, causes the oil fed from the chamber 6 to flow outwardly and downwardly, and it thereby acts to wash away any dirt that may accumulate at the joint between the outer ends of the hub members and adjacent heads on the journal members.

In the event of wear between the bearing surfaces of the hub members and journal members, this wear may be taken up by removing the journal members and filing off their inner abutting ends, there being sufficient clearing space between the heads and ends of the hub members to permit the journal members to be again tightened up with their inner ends in contact, without binding the heads against the ends of the hub members.

In order to hold the journal members in fixed relation to the supporting arms so that the members will be prevented from rotating with the hub, the heads 9 on said journal members are formed with radial outwardly extending stop shoulders 22 adapted to be engaged by suitable inwardly extending stops 23 on the inner sides of the arms.

My improved rolling colter embodying the characteristics and structural features described, is simple in form, durable in operation, may be produced at a minimum expense, may be easily lubricated and will effectually exclude dust or dirt from the bearing surfaces. The blade in its rotary motion will run true, and may be continued in use throughout its life without regard to the wear on the bearing surfaces of the hub, since the journal bearings may be adjusted to take up for such wear; and where the wear is so extensive as to impair the further usefulness of the journal members, the worn ones may be conveniently removed and replaced by new ones.

In the foregoing description and accompanying drawings I have disclosed my invention in the particular form and detailed construction which I prefer to adopt, but it will be manifest to the skilled mechanic that the details may be variously changed and modified without departing from the limits of my invention, provided the operation is substantially as indicated above.

Further it will be understood that the invention is not limited to any particular form or construction of the parts except in so far as such limitations are specified in the claims.

Having thus described my invention, what I claim is:

1. In a rolling colter, the combination of a colter blade provided with a central opening therethrough, opposing hub members fastened to opposite sides of the blade with their adjacent faces extending inwardly beyond the edge of the opening in the blade to conjointly form an annular unobstructed oil chamber, said hub members being formed with alined axial bearing openings communicating with said oil chamber, and two journal members extending into the bearing opening from opposite ends and having their inner ends exposed in said oil chamber.

2. In a rolling colter, the combination of a colter blade, hub members fixed to opposite sides of the same, one of said members having its inner face recessed so as to constitute an oil feeding chamber closed on its inner side by the side of the blade to supply oil to the bearing surfaces of the hub, and means for rotatably supporting said hub.

3. In a rolling colter, the combination of a colter blade, a hub fixed thereto and provided with an axial bearing opening, journal members extending into said bearing opening and projecting beyond the ends of the hub, peripheral heads on the projecting ends of said journal members overhanging the ends of the hub, opposing supporting arms extending flatly against the outer sides of said heads and engaged thereby, the free ends of said arms being provided with edge flanges extending in close proximity to the peripheral edges of the heads and overhanging the joint between the heads and ends of the hub, and means for connecting said arms and journal members together.

4. In a rolling colter, the combination of a colter support provided with supporting arms, a colter blade having a hub fixed thereto and situated between the supporting arms, said hub being provided with an axial bearing opening, journal members extending into said bearing opening from opposite ends of the same and provided at their outer ends with peripheral heads overhanging the ends of the hub, and a through bolt extending through said arms and journal members, said heads and arms being provided with stop lugs engaging each other to prevent the rotation of the journal members relatively to the arms.

In testimony whereof, I have affixed my signature.

HARRY S. DICKINSON.

Copies of this patent may be obtained for five cents each, by addressing the "Commissioner of Patents, Washington, D. C."